US010260966B2

(12) United States Patent
Morita et al.

(10) Patent No.: US 10,260,966 B2
(45) Date of Patent: Apr. 16, 2019

(54) MOTOR CONTROL DEVICE, CONTROL METHOD, AND NON-TRANSITORY COMPUTER READABLE MEDIUM ENCODED WITH CONTROL PROGRAM, FOR SPECIFYING TYPE OF TEMPERATURE SENSOR

(71) Applicant: FANUC CORPORATION, Yamanashi (JP)

(72) Inventors: Yuuki Morita, Yamanashi (JP); Tadashi Okita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 123 days.

(21) Appl. No.: 15/665,980

(22) Filed: Aug. 1, 2017

(65) Prior Publication Data
US 2018/0045583 A1 Feb. 15, 2018

(30) Foreign Application Priority Data

Aug. 12, 2016 (JP) .................................. 2016-158860

(51) Int. Cl.
*G01K 13/08* (2006.01)
*G01K 1/16* (2006.01)
(Continued)

(52) U.S. Cl.
CPC ............. *G01K 15/00* (2013.01); *G01K 13/00* (2013.01); *H02P 29/60* (2016.02); *G01K 2205/00* (2013.01)

(58) Field of Classification Search
CPC ...... G01K 13/00; G01K 15/005; G01K 13/02; G01K 13/10; G01K 2205/00; G01K 13/08;
(Continued)

(56) References Cited

U.S. PATENT DOCUMENTS 4,340,886 A * 7/1982 Boldt .................... F16O 17/243
340/502
9,004,751 B2 * 4/2015 Sakurada .............. F02D 41/222
374/1
(Continued)

FOREIGN PATENT DOCUMENTS

JP H10-124131 A 5/1998
JP H11-226294 A 8/1999
(Continued)

*Primary Examiner* — Gail Kaplan Verbitsky
(74) *Attorney, Agent, or Firm* — Studebaker & Brackett PC

(57) ABSTRACT

To provide a motor control device that specifies a type of temperature sensor by a simple technique, even in a case of the type of temperature sensor installed to a motor being unclear. A motor control device includes: a temperature detection circuit capable of mounting a plurality of types of temperature sensors as a temperature sensor installed to a motor; a storage unit that stores a plurality of conversion tables corresponding to each of the plurality of types of temperature sensors; and a motor temperature detection part that detects a motor temperature using feedback data from the temperature sensor and a conversion table corresponding to the type of temperature sensor, in which the type of temperature sensor installed to the motor is specified using comparison results between the temperature of a different motor from the motor obtained from a known type of temperature sensor or the temperature of the motor control device itself, and a plurality of calculated temperatures calculated using feedback data and conversion tables corresponding to each of the plurality of types of temperatures sensors.

10 Claims, 7 Drawing Sheets

(51) Int. Cl.
  *G01K 7/00* (2006.01)
  *G01K 15/00* (2006.01)
  *G01K 13/00* (2006.01)
  *H02P 29/60* (2016.01)

(58) Field of Classification Search
  CPC ........ G01K 1/16; G01K 7/00; G01N 25/4893; G01N 30/30; G01N 25/22
  USPC .............................. 374/1, 153, 141, 110, 144
  See application file for complete search history.

(56) References Cited

U.S. PATENT DOCUMENTS

| | | | |
|---|---|---|---|
| 9,726,576 B2 * | 8/2017 | MacDonald | G01M 15/14 |
| 2012/0201269 A1 * | 8/2012 | Mujumdar | G01K 1/14 |
| | | | 374/141 |
| 2014/0269812 A1 * | 9/2014 | Deutscher | G01K 15/005 |
| | | | 374/1 |

FOREIGN PATENT DOCUMENTS

| | | | |
|---|---|---|---|
| JP | 2002-357484 A | 12/2002 | |
| JP | 2005-208955 A | 8/2005 | |
| JP | 2011-060076 A | 3/2011 | |
| JP | 2014-081691 A | 5/2014 | |

* cited by examiner

MOTOR CONTROL DEVICE, CONTROL METHOD, AND NON-TRANSITORY COMPUTER READABLE MEDIUM ENCODED WITH CONTROL PROGRAM, FOR SPECIFYING TYPE OF TEMPERATURE SENSOR

This application is based on and claims the benefit of priority from Japanese Patent Application No. 2016-158860, filed on 12 Aug. 2016, the content of which is incorporated herein by reference.

BACKGROUND OF THE INVENTION

Field of the Invention

The present invention relates to a motor control device, a control method, and a control program for specifying a type of temperature sensor.

Related Art

Conventionally, in order to obtain data necessitated upon numerical control, or to detect abnormality, a plurality of sensors are installed to a machine tool, etc. However, upon replacing sensors due to age deterioration, etc., it may be replaced to a different type of sensor from the one previously installed. Upon doing so, since the type of the new sensor is unknown, even if calculating the detection value serving as the measurement target using feedback data from this new sensor, it may not be possible to obtain accurate data.

In this point, Patent Document 1 describes a programmable controller made so as to identify types of temperature measurement resistance elements automatically, and import the correct temperature value.

Patent Document 1: Japanese Unexamined Patent Application, Publication No. 2002-357484

SUMMARY OF THE INVENTION

However, with the invention according to Patent Document 1, upon identification of the type of temperature measurement resistance elements, it is necessary to circulate at least two test currents from a constant current circuit to the temperature measurement resistance element, at a stage prior to temperature measurement using this temperature measurement resistance element, and thus the operation for identification has been complicated.

Therefore, the present invention has an object of providing a motor control device that specifies the type of a temperature sensor by a simple technique, and performs correct temperature detection, even in the case of the type of temperature sensor installed to a motor being unclear.

According to a first aspect of the present invention, a motor control device (e.g., the motor control device 100 described later) includes: a temperature detection circuit (e.g., the temperature detection circuit 122 described later) capable of mounting a plurality of types of temperature sensors as a temperature sensor (e.g., the temperature sensor 210 described later) installed to a motor (e.g., the motor 200 described later); a storage unit (e.g., the storage unit 111 described later) that stores a plurality of conversion tables corresponding to the plurality of types of temperature sensors, respectively; and a motor temperature detection part (e.g., the motor temperature detection part 123 described later) that detects motor temperature using feedback data from the temperature sensor, and the conversion table corresponding to a type of the temperature sensor; and a sensor specification part (124) that, in a case of the type of the temperature sensor installed to the motor being unclear, specifies the type of the temperature sensor installed to the motor using comparison results between: a temperature of a different motor from the motor obtained from a known type of temperature sensor or temperature of the motor control device itself; and a plurality of calculated temperatures calculated using the feedback data and the conversion tables corresponding to the plurality of types of temperature sensors, respectively.

According to a second aspect of the present invention, in the motor control device as described in the first aspect, the sensor specification part (e.g., the sensor specification part 124 described later) may specify a type of sensor having the smallest difference between: the temperature of the different motor from the motor or the temperature of the motor control device itself; and the calculated temperature, as the type of the temperature sensor installed to the motor.

According to a third aspect of the present invention, in the motor control device as described in the first aspect, the sensor specification part (e.g., the sensor specification part 124 described later) may specify a type of sensor for which the difference between the temperature of the different motor from the motor or the temperature of the motor control device itself, and the calculated temperature is within a predetermined value, as the type of the temperature sensor installed to the motor.

According to a fourth aspect of the present invention, the motor control device as described in the any one of the first to third aspects may further include a display unit (e.g., the display unit 114 described later) that displays the type of the temperature sensor specified by the sensor specification part (e.g., the sensor specification part 124 described later).

According to a fifth aspect of the present invention, in the motor control device as described in the any one of the first to fourth aspects, the motor temperature detection part (e.g., the motor temperature detection part 123a described later) may detect the motor temperature using the conversion table corresponding to the temperature sensor specified by the sensor specification part (e.g., the sensor specification part 124a described later) and the feedback data.

According to a sixth aspect of the present invention, the motor control device as described in the any one of the first to fifth aspects may further include an energization stop time detection part (e.g., the energization stop time detection part 112 described later) that detects an energization stop time of the motor (e.g., the motor 200a described later) and a different motor (e.g., the motor 200b described later) from the motor (200a), in a case of the different motor being present, in which the sensor specification part may specify the type of the temperature sensor of the motor, in a case of the energization stop time detected by the energization stop time detection part having exceeded a predetermined value.

According to a seventh aspect of the present invention, the motor control device as described in the any one of the first to sixth aspects may further include a motor temperature estimation part (e.g., the motor temperature estimation part 121 described later) that estimates a rise value for the motor temperature from an electrical current value and thermal time constant of the motor after energization start, in which the sensor specification part, in a case of a plurality of candidates existing as the type of sensor specified by the sensor specification part, may calculate rise values for a plurality of motor temperatures using a plurality of the conversion tables corresponding to a plurality of types of sensors serving as the candidates and the feedback data, and the sensor specification part (e.g., the sensor specification part 124 described later) may compare between an estimated rise value estimated by the motor temperature estimation part, and a plurality of calculated temperature rise values calculated by the sensor specification part, and specifies the type of the temperature sensor installed to the motor according to comparison results thereof.

According to an eighth aspect of the present invention, in the motor control device as described in the seventh aspect, the sensor specification part (e.g., the sensor specification part 124 described later) may specify a type of sensor having the smallest difference between the estimated rise value and the calculated rise value in the comparison, as the type of the temperature sensor installed to the motor.

According to a ninth aspect of the present invention, in a control method conducted by a motor control device including: a temperature detection circuit (e.g., the temperature detection circuit 122 described later) capable of mounting a plurality of types of temperature sensors as a temperature sensor (e.g., the temperature sensor 210 described later) installed to a motor (e.g., the motor 200 described later); a storage unit (e.g., the storage unit 111 described later) that stores a plurality of conversion tables corresponding to the plurality of types of temperature sensors, respectively; and a motor temperature detection part (e.g., the motor temperature detection part 123 described later) that detects motor temperature using feedback data from the temperature sensor, and the conversion table corresponding to a type of the temperature sensor, the method including: in a case of the type of the temperature sensor installed to the motor being unclear, the sensor specification part (e.g., the sensor specification part 124 described later) specifying the type of the temperature sensor installed to the motor using a comparison result between: a temperature of a different motor from the motor obtained from a known type of temperature sensor or temperature of the motor control device itself; and a plurality of calculated temperatures calculated using the feedback data and conversion tables corresponding to each of the plurality of types of temperature sensors.

According to a tenth aspect of the present invention, a control program enables a computer to function as a motor control device including a temperature detection circuit (e.g., the temperature detection circuit 122 described later) capable of mounting a plurality of types of temperature sensors as a temperature sensor (e.g., the temperature sensor 210 described later) installed to a motor; a storage unit (e.g., the storage unit 111 described later) that stores a plurality of conversion tables corresponding to the plurality of types of temperature sensors, respectively; and a motor temperature detection part (e.g., the motor temperature detection part 123 described later) that detects motor temperature using feedback data from the temperature sensor, and the conversion table corresponding to a type of the temperature sensor, the control program causing the computer to execute a step of specifying, in a case of the type of the temperature sensor installed to the motor being unclear, the type of the temperature sensor installed to the motor using a comparison result between: a temperature of a different motor from the motor obtained from a known type of temperature sensor or temperature of the motor control device itself; and a plurality of calculated temperatures calculated using the feedback data and conversion tables corresponding to each of the plurality of types of temperature sensors.

According to the present invention, it becomes possible to specify the type of temperature sensor by a simple technique, and perform correct temperature detection, even in a case of the type of temperature sensor installed to a motor being unclear.

DETAILED DESCRIPTION OF THE INVENTION

Hereinafter, an embodiment of the present invention will be described in detail while referencing FIGS. 1 to 7.

<Configuration of Motor Control Device>

Figure 1:
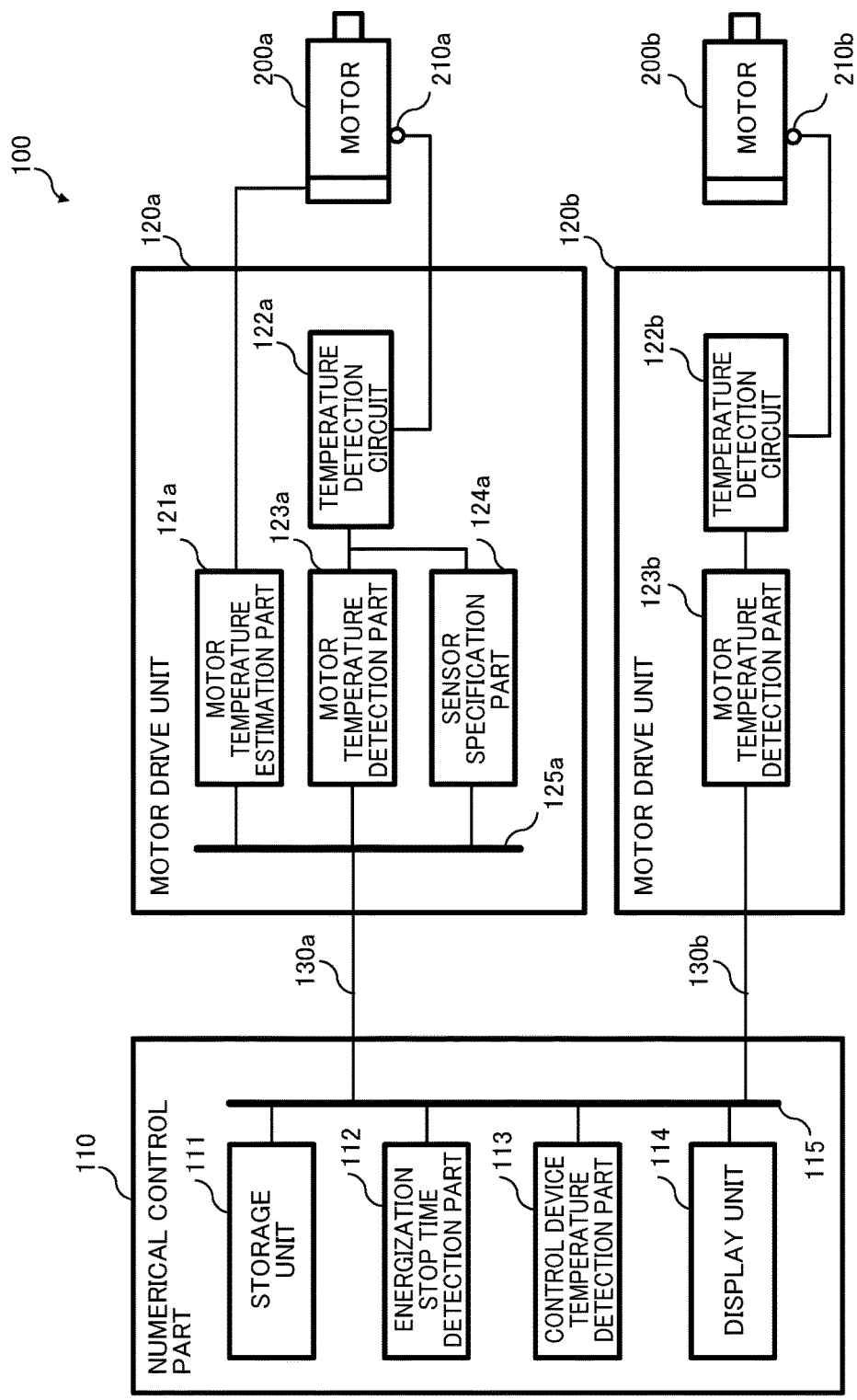
FIG. 1 is a functional block diagram of a motor control device according to an embodiment of the present invention.

FIG. 1 is a functional block diagram of a motor control device 100 according to the present invention. The motor control device 100 has a numerical control part 110, and as many motor drive units 120 as the number of controlled motors, and both are communicable with each other via a communication circuit 130. The functional block diagram shown in FIG. 1 shows two motors 200a and 200b, and two motor drive units of the motor drive unit 120a and motor drive unit 120b, as the motor drive unit 120 corresponding to these. At the same time, it shows a communication circuit 130a as a communication circuit between the numerical control part 110 and motor drive unit 120a, and a communication circuit 130b as a communication circuit between the numerical control part 110 and motor drive unit 120b. However, the embodiment of the present invention is not limited to this, and it is possible to include any number of motors 200, motor drive units 120 and communication circuits 130.

The numerical control part 110 conducts numerical control on the motor 200, and has a storage unit 111, energization stop time detection part 112, control device temperature detection part 113, and display unit 114. These are mutually communicable via a bus 115.

The storage unit 111 stores at least as many conversion tables between feedback data from the temperature sensor 210 described later and the temperature corresponding to the feedback data, as the number of types of temperature sensors 210 installable to the motor 200. Furthermore, the storage unit 111 transmits the conversion table to a motor temperature detection part 123 and sensor specification part 124 described later.

The energization stop time detection part 112 detects both the energization stop times for the motor to which an unknown type of temperature sensor is installed, and the motor to which a known type of temperature sensor is installed, immediately after powering up the motor control device 100 and motor 200. Furthermore, the energization stop time detection part 112 transmits the detected energization stop time to the sensor specification part 124 described later.

The control device temperature detection part 113, although not illustrated, uses a temperature sensor installed to the motor control device 100 itself to detect the temperature of the motor control device 100. For example, this temperature sensor, in the case of being installed to the motor drive unit 120a described later, detects the temperature of this motor drive unit 120a as the temperature of the motor control device 100. Furthermore, the control device temperature detection part 113 transmits the detected control device temperature to the sensor specification part 124 described later.

The display unit 114 displays the specification results of the temperature sensor, if the type of an unknown type of temperature sensor is specified by the method described later.

It should be noted that the numerical control part 110 includes, in addition to these constituent elements, the essential constituent elements for conducting numerical control on the motor 200, as a matter of course; however, for the essential constituent elements for conducting numerical control, the explanation and drawings thereof will be omitted.

The motor drive unit 120 drives the motor 200, as well as having a motor temperature estimation part 121, temperature detection circuit 122, motor temperature detection part 123, and sensor specification part 124. Simultaneously with the temperature detection circuit 122, and motor temperature detection part 123 and sensor specification part 124 being connected to each other, the motor temperature estimation part 121, motor temperature detection part 123 and sensor specification part 124 are mutually communicable via a bus 125.

The motor temperature estimation part 121 is connected to the motor 200, and estimates the temperature of the motor 200 using the thermal time constant of the motor 200 and the electrical current value for the current flowing through the motor 200.

The temperature detection circuit 122 is a circuit connected to the motor temperature detection part 123 and sensor specification part 124 described later, and able to mount a plurality of types of temperature sensors 210.

The motor temperature detection part 123, in the case of the type of the temperature sensor 210 installed to the motor 200 being known, detects the temperature of the motor 200 using the feedback data obtained from the temperature sensor 210 installed to the motor 200 via the above-mentioned temperature detection circuit 122, and the conversion table corresponding to the type of this temperature sensor 210 stored by the above-mentioned storage unit 111.

The sensor specification part 124, in the case of the type of the temperature sensor 210 installed to the motor 200 being unknown, calculates a plurality of calculated temperatures, by applying the conversion tables corresponding to all every type of temperature sensor to the feedback data from the temperature sensor 210. Furthermore, the sensor specification part 124 specifies the unknown type of the temperature sensor 210 by comparing this plurality of calculated temperatures with a reference temperature.

It should be noted that the motor drive unit 120 includes, in addition to these constituent elements, the essential constituent elements for driving the motor 200; however, explanation and illustration thereof are omitted for these essential constituent elements.

In addition, in FIG. 1, it is assumed that the type of a temperature sensor 210a installed to a motor 200a is unknown, and the type of a temperature sensor 210b installed to a motor 200b is known. Accompanying this assumption, FIG. 1 shows a state in which the motor drive unit 120b differs from the motor drive unit 120a, and does not include the motor temperature estimation part 121 and sensor specification part 124; however, the embodiments of the present invention are not limited thereto. For example, the motor drive unit 120b driving the motor 200b to which the known temperature sensor 210b is installed may include a motor temperature estimation part 121a and sensor specification part 124b, similarly to the motor drive unit 120a.

The above is the configuration of the motor control device 100 according to an embodiment of the present invention.

<Operation of Motor Control Device>

Figure 2:
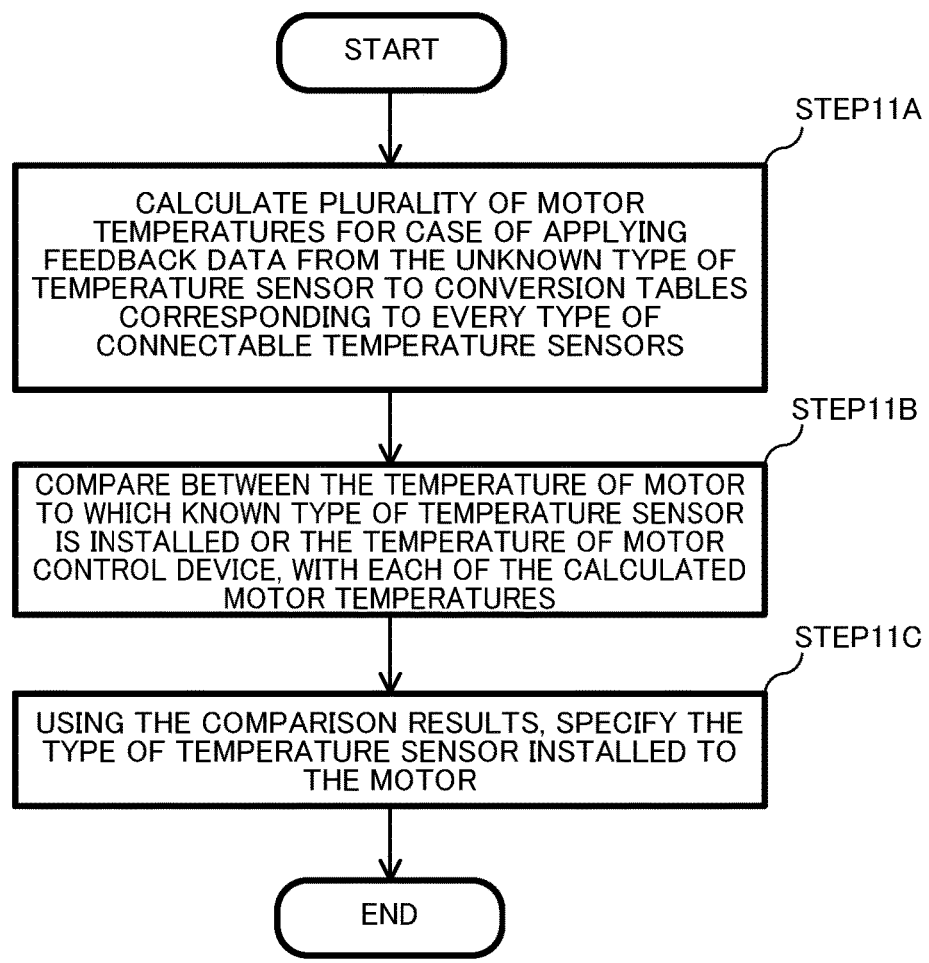
FIG. 2 is a chart showing a method of specifying a type of sensor used by the motor control device according to the embodiment of the present invention.
Figure 3:
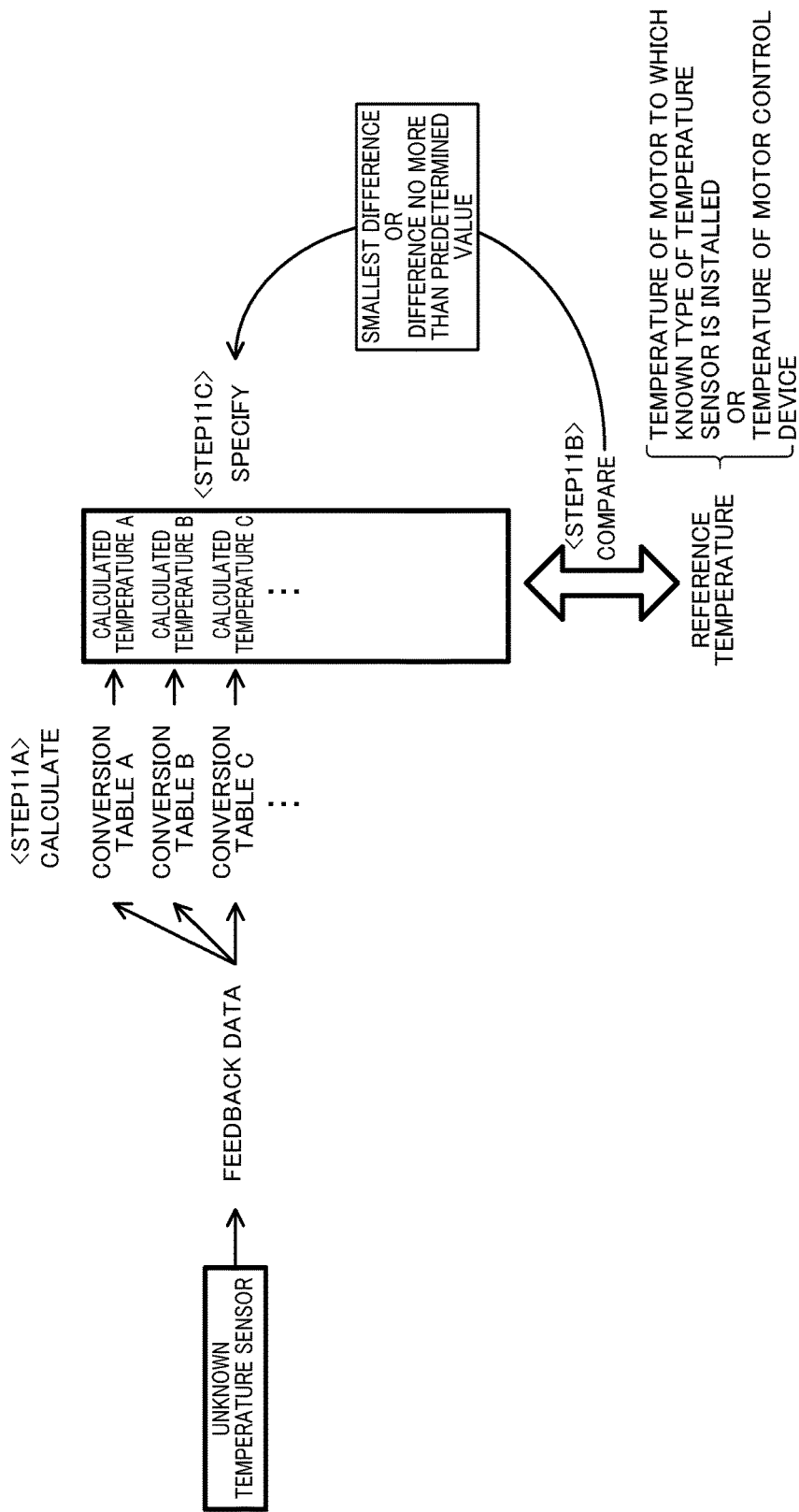
FIG. 3 is a drawing showing the operational flow of specifying the type of sensor used by the motor control device according to the embodiment of the present invention.

Next, although partly repeating, a method conducted by the motor control device 100 according to the embodiment of the present invention for specifying an unknown type of temperature sensor will be described using FIGS. 2 and 3.

In STEP 11A, the sensor specification part 124a receives feedback data via the temperature detection circuit 122a from the temperature sensor 210a of unknown type, as well as receiving from the storage unit 111 a plurality of conversion tables corresponding to every type of temperature sensor mountable to the temperature detection circuit 122a. Using this feedback data and conversion tables for every type, a plurality of motor temperatures corresponding to every types of temperature sensor is calculated. In other words, as shown in FIG. 3, a conversion table A corresponding to type A, a conversion table B corresponding to type B, . . . exist for every type of temperature sensor in the storage unit 111, and the sensor specification part 124a acquires a calculated temperature A, calculated temperature B, . . . by applying these conversion tables A, B, . . . to the feedback data.

In STEP 11B, the sensor specification part 124a compares the above-mentioned calculated temperatures with the motor temperature of the motor 200b detected by the motor temperature detection part 123b, by applying the conversion table corresponding to this temperature sensor 210b stored in the storage unit 111, to the feedback data from the temperature sensor 210b of known type installed to the motor 200b. Alternatively, especially in the case of a temperature sensor of known type installed to the motor 200 not existing, the sensor specification part 124a compares the above-mentioned calculated temperatures and the temperature of the motor control device 100 itself detected by the control device temperature detection part 113 of the numerical control part 110.

In STEP 11C, the sensor specification part 124a specifies the type of the temperature sensor 210a installed to the motor 200a using the above-mentioned comparison results. Upon doing so, as shown in FIG. 3, the type of the temperature sensor corresponding to the calculated temperature having the smallest difference from the motor temperature of the motor 200b or the temperature of the motor control device 100 itself may be specified as the type of the temperature sensor 210a. Alternatively, the type of the temperature sensor corresponding to a calculated temperature for which the difference from the motor temperature of the motor 200b or the temperature of the motor control device 100 itself is no more than a predetermined value may be specified as the type of the temperature sensor 210a. It should be noted that the operational flow for a case of a plurality of types of the temperature sensors corresponding to the calculated temperature having the smallest difference from the motor temperature of the motor 200b or the temperature of the motor control device 100 itself, or a plurality of types of temperature sensors corresponding to the calculated temperature for which the difference from the motor temperature of the motor 200b or the temperature of the motor control device 100 itself is no more than a predetermined value, existing will be described later.

The above is an operational flow for the motor control device 100 to specify the type of the temperature sensor 210a of unknown type.

After the motor control device 100 specifies the type of the temperature sensor 210a of unknown type, a further operational step using this specified type of temperature sensor 210a may be conducted. The further operational step will be explained while referencing FIGS. 4 and 5.

Figure 4:
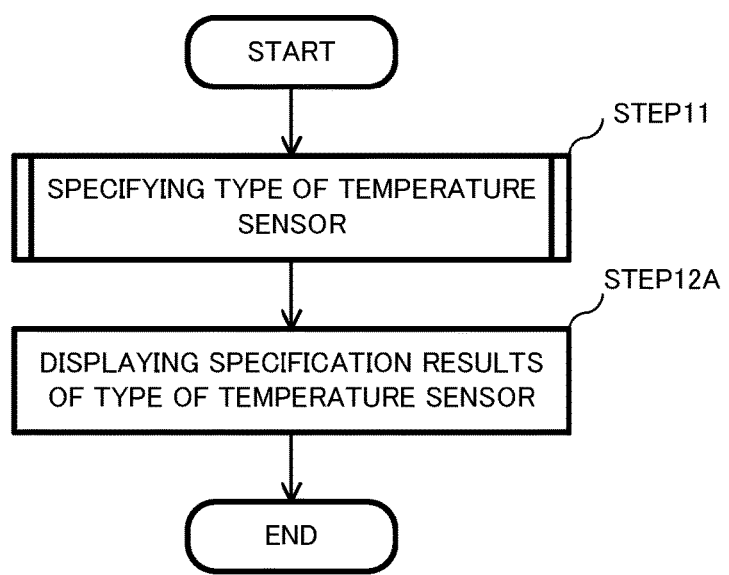
FIG. 4 is a chart showing the operational flow of specifying the type of sensor used by the motor control device according to the embodiment of the present invention.

When referencing FIG. 4, the sensor specification part 124a specifies the type of the temperature sensor 210a by conducting the above-mentioned STEP 11A, STEP 11B and STEP 11C in STEP 11.

In STEP 12A, the display unit 114 of the numerical control part 110 displays the specified type of the temperature sensor 210a.

Figure 5:
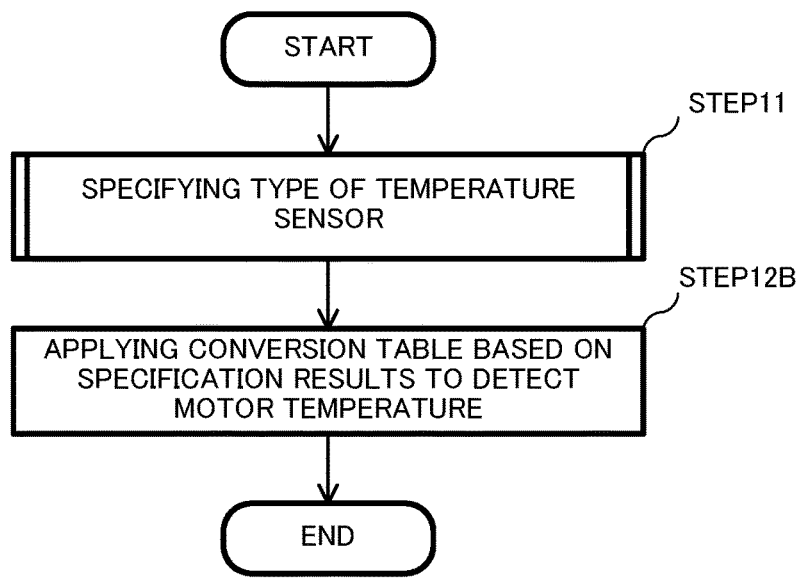
FIG. 5 is a chart showing the operational flow of specifying the type of sensor used by the motor control device according to the embodiment of the present invention.

When referencing FIG. 5, similarly to the flow shown in FIG. 4, the sensor specification part 124a specifies the type of the temperature sensor 210a by conducting the above-mentioned STEP 11A, STEP 11B and STEP 11C in STEP 11.

In STEP 12B, the motor temperature detection part 123a receives the conversion table corresponding to the specified type of temperature sensor from the storage unit 111 of the numerical control part 110, and detects the temperature of the motor 200a by applying this conversion table to the feedback data from the temperature sensor 210a.

According to the above-mentioned embodiment, even in a case of the type of temperature sensor installed to a motor being unclear, it becomes possible to specify the type of temperature sensor, and further perform correct temperature detection.

<First Modified Example>

Next, a first modified example of the above-mentioned operational flow will be described in detail while referencing FIG. 6.

Figure 6:
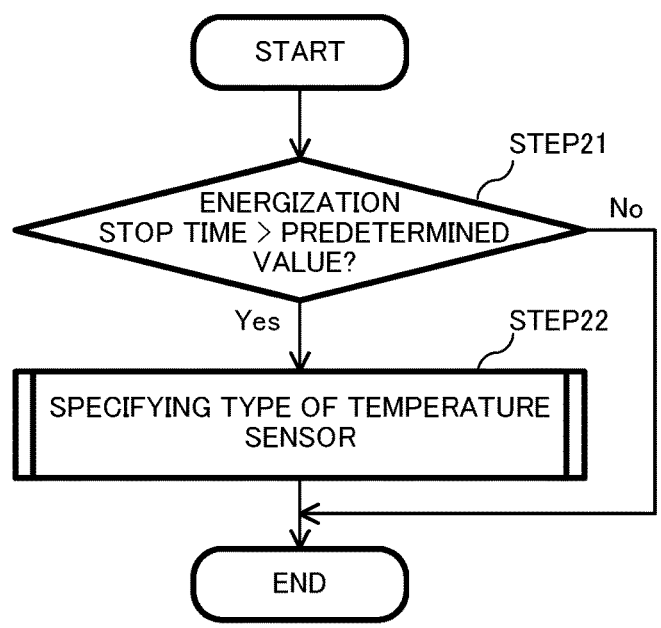
FIG. 6 is a chart showing the operational flow specifying the type of sensor used by the motor control device according to the embodiment of the present invention.

FIG. 6 is the operational flow of conducting processing for specifying the type of an unknown temperature sensor, only in the case of the energization stop time having exceeded a predetermined value. In the case of the energization time being long, since the divergence of the actual temperature increases due to the difference in properties, load condition, etc. of motors between the subject motor and the motor as a comparison target, the possibility raises of normal judgment in the sensor specification part no longer being possible. In contrast, in the case of the non-energization time being long, since the temperatures of the subject motor and the motor as the comparison target decline, and become asymptotic with the ambient temperature, normal judgment in the sensor specification part becomes possible. For this reason, prior to specification of the type of temperature sensor, it conducts comparison between the energization stop time and a predetermined value.

When referencing FIG. 6, in STEP 21, the sensor specification part 124a receives information related to the energization stop time for the motor 200a and motor 200b, from the energization stop time detection part 112 of the numerical control part 110, and compares this energization stop time with the predetermined value. In the case of the energization stop time exceeding the predetermined value (STEP 21: YES), the processing advances to STEP 22. In the case of the energization stop time being no more than the predetermined value (STEP 21: NO), the operational flow is ended without doing anything.

In STEP 22, the sensor specification part 124a specifies the type of the unknown temperature sensor 210a, by executing the same steps of the above-mentioned STEP 11A, STEP 11B and STEP 11C.

The above is the operational flow of conducting processing for specifying the type of an unknown temperature sensor, only in the case of the energization stop time having exceeded a predetermined value.

The motor control device 100 is thereby able to specify the type of the temperature sensor 210a only in the case of the energization stop time having exceeded the predetermined value. It is thereby possible to prevent a judgment mistake of the temperature sensor specification part, which has a possibility of occurring due to the difference in actual temperatures between the subject motor and the comparison target motor during temperature sensor specification.

It should be noted that, in the operational flow shown in FIG. 6, after conducting the above-mentioned STEP 22, the operation is ended; however, the embodiments of the present invention are not limited thereto. For example, the specification results for the type of temperature sensor may be displayed by the display unit 114 by conducting the above-mentioned STEP 12A after conducting STEP 22. Alternatively, the motor temperature of the motor 200a may be detected by the motor temperature detection part 123a by conducting the above-mentioned STEP 12B after conducting STEP 22.

<Second Modified Example>

Next, a second modified example of the above-mentioned operational flow will be described in detail while referencing FIG. 7.

Figure 7:
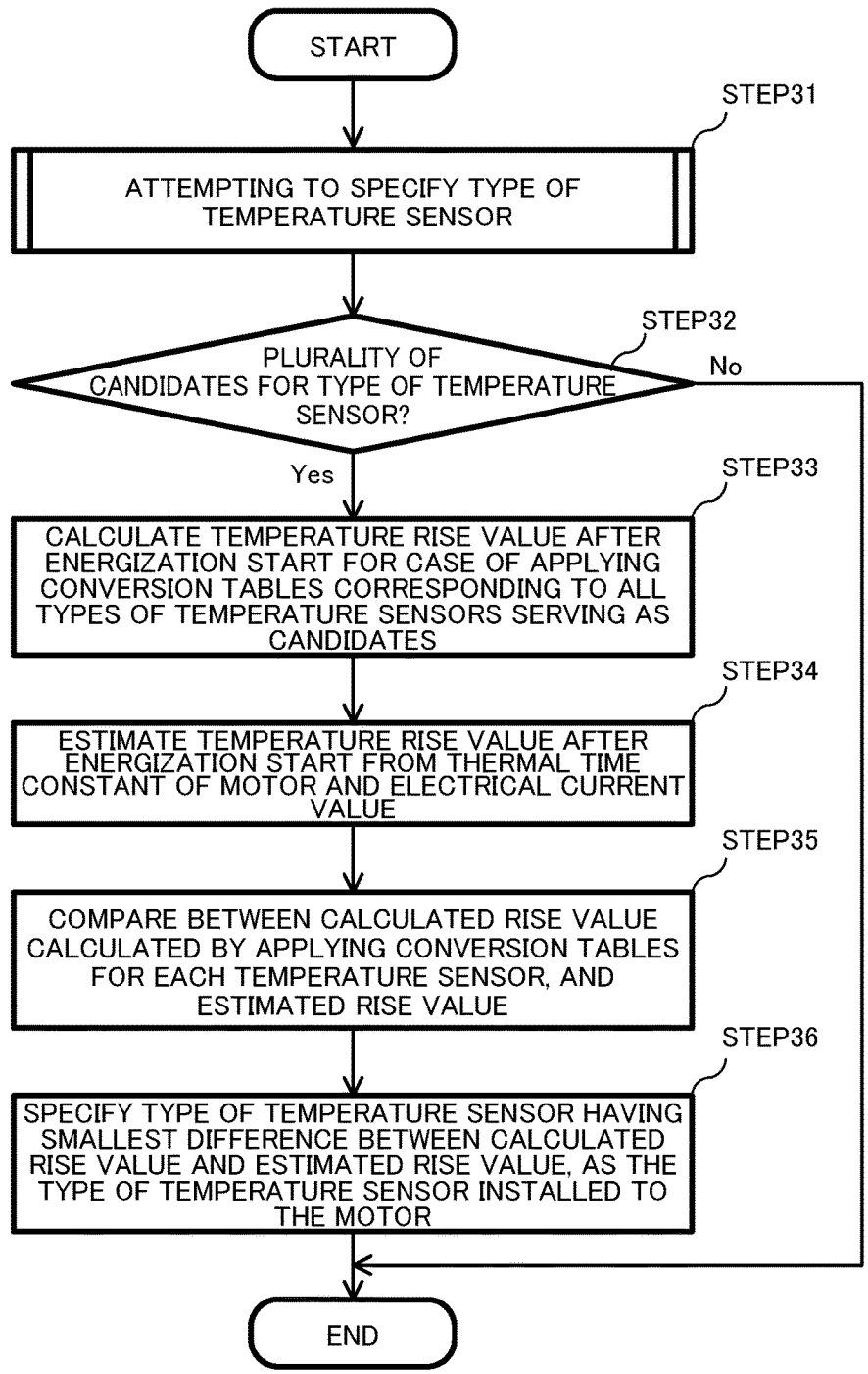
FIG. 7 is a chart showing the operational flow specifying the type of sensor used by the motor control device according to the embodiment of the present invention.

FIG. 7 is the operational flow in the case of, despite the sensor specification part 124a trying to specify the type of the unknown temperature sensor 210a as described above, a plurality of candidates thereof existing.

In STEP 31, the sensor specification part 124a attempts specification of the type of the temperature sensor 210a according to the same sequence as the above-mentioned STEP 11.

In STEP 32, in the case of a plurality of candidates for the type of the unknown temperatures sensor 210a existing (STEP 32: YES), the processing advances to STEP 33. In the case of a plurality of candidates for the type of the temperature sensor 210a not existing (STEP 32: NO), the processing is ended without conducting the processing of the following STEP 33 to STEP 36.

In STEP 33, after energization of the motor 200a is started, the sensor specification part 124a calculates as many motor temperature rise values after energization start of the motor 200a as the number of candidates, by applying the plurality of conversion tables corresponding to every type of temperature sensor that is a candidate at the present time, to the feedback data from the temperature sensor 210a.

In STEP 34, the motor temperature estimation part 121a estimates the motor temperature rise values after energization start of the motor 200a, from the thermal time constant of the motor 200a and the electrical current value of current flowing through the motor 200a.

In STEP 35, the sensor specification part 124a compares the motor temperature rise value (calculated rise value) calculated in STEP 33, and the motor temperature rise value (estimated rise value) estimated in STEP 34.

In STEP 36, the sensor specification part 124a specifies the type of temperature sensor corresponding to the conversion table having the smallest difference between the calculated motor temperature rise value (calculated rise value) and the estimated motor temperature rise value (estimated rise value), as the type of sensor 210a installed to the motor 200a.

The above is the operational flow in the case of specifying one type of unknown temperature sensor 210a, in the case of the sensor specification part 124a, despite trying to specify the type of the unknown temperature sensor 210a, a plurality of candidates thereof existing.

It should be noted that, although the operations are ended after conducting the processing of the above-mentioned STEP 36 in the operational flow shown in FIG. 7, the embodiments of the present invention are not limited thereto. For example, the specification results for the type of the temperature sensor 210a may be displayed by conducting the above-mentioned processing of STEP 12A after conducting the processing of STEP 36. Alternatively, the motor temperature of the motor 200a may be detected by conducting the above-mentioned processing of STEP 12B after conducting the processing of STEP 36.

According to the operational flow illustrated in FIG. 7, by simply conducting the processing of STEP 31, i.e. STEP 11A to STEP 11C, it becomes possible to specify the type of the temperature sensor 210a even in a case of not being able to limit the candidates for the type of the unknown temperature sensor 210a to one.

Although embodiments of the present invention have been explained above, the present invention is not to be limited to the aforementioned embodiments. In addition, the effects described in the present embodiment are merely listing the more preferred effects produced from the present invention, and the effects according to the present invention are not to be limited to those described in the present embodiment.

In addition, although not illustrated, it is well known to those skilled in the art that the above-mentioned numerical control part 110 has a CPU, ROM, RAM, CMOS memory, etc., and these are configured to be mutually communicable via a bus.

The CPU is a processor that controls the motor control device 100 in entirety. The CPU reads system programs and application programs stored in the ROM via the bus, and controls the motor control device overall in accordance with the system programs and application programs.

A variety of data such as temporary calculation data and display data are stored in the RAM.

The CMOS memory is configured as non-volatile memory that is backed up by a battery (not illustrated), and the storage state is retained even if the power source of the motor control device is turned OFF.

The control method according to the motor control device 100 is realized by way of software. In the case of being realized by software, programs constituting this software are installed on a computer (motor control device 100). In addition, these programs may be recorded on removable media and distributed to the user, or may be distributed by being downloaded to the user's computer via a network. Furthermore, these programs may be provided to the user's computer (motor control device 100) as a Web service via a network, without being downloaded.

EXPLANATION OF REFERENCE NUMERALS 100 motor control device
110 numerical control part
111 storage unit
112 energization stop time detection part
113 control device temperature detection part
114 display unit
115 bus
120, 120a, 120b, motor drive unit
121, 121a motor temperature estimation part
122, 122a, 122b temperature detection circuit
123, 123a, 123b motor temperature detection part
124, 124a sensor specification part
125, 125a bus
130, 130a, 130b communication circuit
200, 200a, 200b motor
210, 210a, 210b temperature sensor

What is claimed is:

1. A motor control device comprising: a temperature detection circuit capable of mounting a plurality of types of temperature sensors as a temperature sensor installed to a motor; a storage unit that stores a plurality of conversion tables corresponding to the plurality of types of temperature sensors, respectively; and a motor temperature detection part that detects motor temperature using feedback data from the temperature sensor, and the conversion table corresponding to a type of the temperature sensor; and
   a sensor specification part that, in a case of the type of the temperature sensor installed to the motor being unclear, specifies the type of the temperature sensor installed to the motor using comparison results between: a temperature of a different motor from the motor obtained from a known type of temperature sensor or temperature of the motor control device itself; and a plurality of calculated temperatures calculated using the feedback data and the conversion tables corresponding to the plurality of types of temperature sensors, respectively.

2. The motor control device according to claim 1, wherein the sensor specification part specifies a type of sensor having the smallest difference between: the temperature of the different motor from the motor or the temperature of the motor control device itself; and the calculated temperature, as the type of the temperature sensor installed to the motor.

3. The motor control device according to claim 1, wherein the sensor specification part specifies a type of sensor for which the difference between the temperature of the different motor from the motor or the temperature of the motor control device itself, and the calculated temperature is within a predetermined value, as the type of the temperature sensor installed to the motor.

4. The motor control device according to claim 1, further comprising a display unit that displays the type of the temperature sensor specified by the sensor specification part.

5. The motor control device according to claim 1, wherein the motor temperature detection part detects the motor temperature using the conversion table corresponding to the temperature sensor specified by the sensor specification part and the feedback data.

6. The motor control device according to claim 1, further comprising an energization stop time detection part that detects an energization stop time of the motor and a different motor from the motor, in a case of the different motor being present,
   wherein the sensor specification part specifies the type of the temperature sensor of the motor, in a case of the energization stop time detected by the energization stop time detection part having exceeded a predetermined value.

7. The motor control device according to claim 1, further comprising:

a motor temperature estimation part that estimates a rise value for the motor temperature from an electrical current value and thermal time constant of the motor after energization start, wherein the sensor specification part, in a case of a plurality of candidates existing as the type of sensor specified by the sensor specification part, calculates rise values for a plurality of motor temperatures using a plurality of the conversion tables corresponding to a plurality of types of sensors serving as the candidates and the feedback data, and wherein the sensor specification part compares between an estimated rise value estimated by the motor temperature estimation part, and a plurality of calculated temperature rise values calculated by the sensor specification part, and specifies the type of the temperature sensor installed to the motor according to comparison results thereof.

8. The motor control device according to claim 7, wherein the sensor specification part specifies a type of sensor having the smallest difference between the estimated rise value and the calculated rise value in the comparison, as the type of the temperature sensor installed to the motor.

9. A control method conducted by a motor control device including: a temperature detection circuit capable of mounting a plurality of types of temperature sensors as a temperature sensor installed to a motor; a storage unit that stores a plurality of conversion tables corresponding to the plurality of types of temperature sensors, respectively; and a motor temperature detection part that detects motor temperature using feedback data from the temperature sensor, and the conversion table corresponding to a type of the temperature sensor, the method comprising:

in a case of the type of the temperature sensor installed to the motor being unclear, the sensor specification part specifying the type of the temperature sensor installed to the motor using a comparison result between: a temperature of a different motor from the motor obtained from a known type of temperature sensor or temperature of the motor control device itself; and a plurality of calculated temperatures calculated using the feedback data and conversion tables corresponding to each of the plurality of types of temperature sensors.

10. A non-transitory computer readable medium encoded with a control program for enabling a computer to function as a motor control device including a temperature detection circuit capable of mounting a plurality of types of temperature sensors as a temperature sensor installed to a motor; a storage unit that stores a plurality of conversion tables corresponding to the plurality of types of temperature sensors, respectively; and a motor temperature detection part that detects motor temperature using feedback data from the temperature sensor, and the conversion table corresponding to a type of the temperature sensor, the control program causing the computer to execute a step of specifying, in a case of the type of the temperature sensor installed to the motor being unclear, the type of the temperature sensor installed to the motor using a comparison result between: a temperature of a different motor from the motor obtained from a known type of temperature sensor or temperature of the motor control device itself; and a plurality of calculated temperatures calculated using the feedback data and conversion tables corresponding to each of the plurality of types of temperature sensors.

* * * * *